(12) United States Patent
Hiromori (10) Patent No.: US 7,365,739 B2
(45) Date of Patent: Apr. 29, 2008

(54) COMPUTER MOUSE

(75) Inventor: Junji Hiromori, Tokyo (JP)

(73) Assignee: Hiromori Corporation, Tokyo (JP)

( * ) Notice: Subject to any disclaimer, the term of this patent is extended or adjusted under 35 U.S.C. 154(b) by 551 days.

(21) Appl. No.: 10/845,723

(22) Filed: May 14, 2004

(65) Prior Publication Data

US 2005/0253811 A1    Nov. 17, 2005

(51) Int. Cl.
*G06F 3/033* (2006.01)
(52) U.S. Cl. .................. 345/163; D14/402
(58) Field of Classification Search .......... 345/163; D14/402
See application file for complete search history.

(56) References Cited

U.S. PATENT DOCUMENTS

2003/0090464 A1* 5/2003 Lai et al. ............... 345/163
2005/0134565 A1* 6/2005 Hong ..................... 345/163

\* cited by examiner

*Primary Examiner*—Amr A. Awad
*Assistant Examiner*—Randal Willis
(74) *Attorney, Agent, or Firm*—Dilworth & Barrese LLP (57) ABSTRACT

A computer mouse is provided which includes an elastic cover detachably secured upon a main body of the mouse, to enhance ease of operation and reduce muscle strain and soreness by repeatedly operating the computer mouse. The main body has left and right click knobs and optionally a scrolling wheel pivotally mounted thereon. The cover and main body can be complementary coupled together through respective mating convex and concave portions. A display surface is explicitly provided on the main body and/or cover to allow for labeling of instructional information and/or advertising. Additionally, the computer mouse, notably the detachably mounted cover member, can be provided in an attractive shape to encourage use by a child.

12 Claims, 9 Drawing Sheets

COMPUTER MOUSE

BACKGROUND OF THE INVENTION

The present invention is directed to a computer mouse for operating a computer. More particularly, the present invention is directed to an improved computer mouse having structure enhancing operation thereof, avoiding muscular strain to a hand during repeated operation, protecting components of the mouse from damage during use and/or shipping, and even enhancing educational aspects of computer operation, i.e., for a child.

A computer mouse for electrically operating a computer has been known to be provided with standard components such as left and right click portions and a scrolling wheel. The left click portion controls a pointer displayed upon a screen of a computer terminal while the right click portion generally activates a menu in conjunction with the particular computer screen being displayed. Additionally, the scrolling wheel allows for scrolling up or down of the displayed computer screen. The mouse is electrically coupled to the computer, either directly through a connecting wire or remotely by radio frequency, and is generally formed of hard plastic.

However, debilitation of muscle use and control by a user of a computer and accompanying mouse over extended periods of time, has become a great problem. For example, carpal tunnel syndrome affects many long-time computer users. In particular, muscle soreness of the hand and fingers of a user can develop by extended gripping, movement and operation of a computer mouse over time. Since computers have rapidly become an integral, indispensable part of the living environment, both at home and work, it is critical physical discomfort and muscular debilitation associated with extended computer use be reduced or eliminated altogether. Furthermore, it is essential that people rapidly learn computer skills to successfully function in the workplace, home and most importantly school in the case of children.

SUMMARY OF THE INVENTION

Accordingly, it is an object of the present invention to improve operating a computer mouse.

It is also an object of the present invention to enhance ease of gripping, moving and adjusting a computer mouse.

It is another object of the present invention to reduce muscle strain and soreness caused by repeatedly gripping and operating a computer mouse.

It is a further object of the present invention to facilitate activation of a computer in response to depressing keys or click portions on a computer mouse.

It is still another object of the present invention to enhance use and operation of a computer mouse, and therefore a computer, by providing for display of information and/or images upon the computer mouse.

It is still a further object of the present invention to facilitate learning to operate a computer and mouse therefor, especially by a child.

These and other objects are explicitly attained by the present invention which is directed to a mouse structured and arranged as an input device for a computer, which comprises a main body arranged to be electrically coupled to a computer, left and right click portions (buttons) and optionally a scrolling wheel located upon an upper surface of the main body, and a mounting cover formed of elastic or resilient material arranged to be detachably mounted upon the main body. The mounting cover and main body comprise convex and concave portions arranged to complementary mate with one another. The mounting cover can take any convenient shape, e.g., elliptical, ring-shaped, etc., or even the shape of a novelty or toy to enhance attraction to a child and encourage use of and learning to operate the computer mouse. An adhesive surface can be optionally applied to the respective surfaces of the main body and mounting member to enhance secure coupling together.

In one embodiment of the inventive mouse, the elastically-formed cover member essentially encompasses the entire upper surface of the computer mouse except for the scrolling wheel (if present), so that the click portions can be depressed through the cover member. The main body of the mouse can feature a display portion, e.g., for labeling, use information or advertising, upon the upper surface of the main body and/or a projecting tongue therefrom. The cover member itself can also present such a display surface.

The inventive mouse reduces muscle soreness and fatigue caused by repeated use of a computer mouse, by softening gripping and/or contact of the respective click portions through the elastic cover member. Such a mouse is extremely easy to manufacture and assemble, because the respective components, namely the main body and cover member, can be separately packaged for shipment (thereby avoiding damage during transit) and easily assembled at a computer to be ready for use. At the same time, the cover member and main body can be easily detached from one another, should the elastic cover member require replacement, e.g., after extended use. This helps conserve material and avoid unnecessary expense because the entire computer mouse need no longer be replaced should the elastic cover member happen to wear out or stiffen after extended use over an extremely long period of time. Protection of the left and right click knobs and scrolling wheel is also enhanced, thus prolonging effective use of the computer mouse. Furthermore, discrete display surfaces are explicitly arranged upon both the mouse main body and cover member, to allow for adequate labeling, instructional information and advertisements, if necessary. The cover member can be produced in the shape of a novelty or toy to enhance attraction to a child and encouraging learning and understanding of computer operation.

BRIEF DESCRIPTION OF THE DRAWINGS

The present invention will be described in greater detail with reference to the accompanying drawings in which.

DESCRIPTION OF THE PREFERRED EMBODIMENTS

Figure 1:
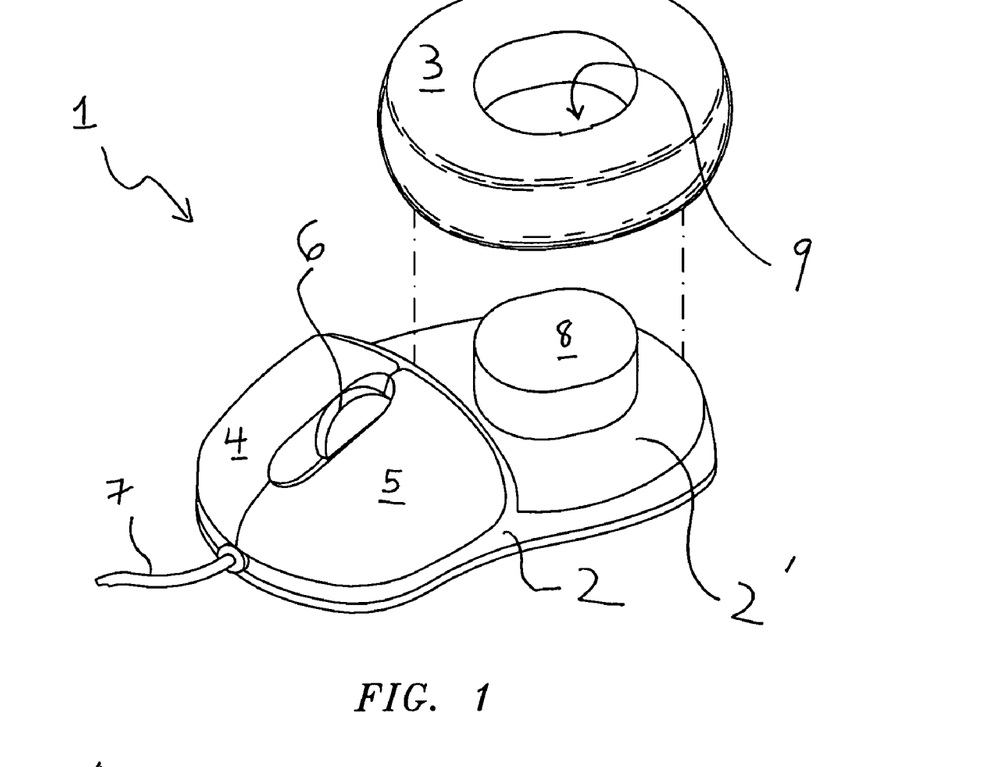
FIG. 1 illustrates an exploded perspective view of one embodiment of the computer mouse according to the present invention.
Figure 2:
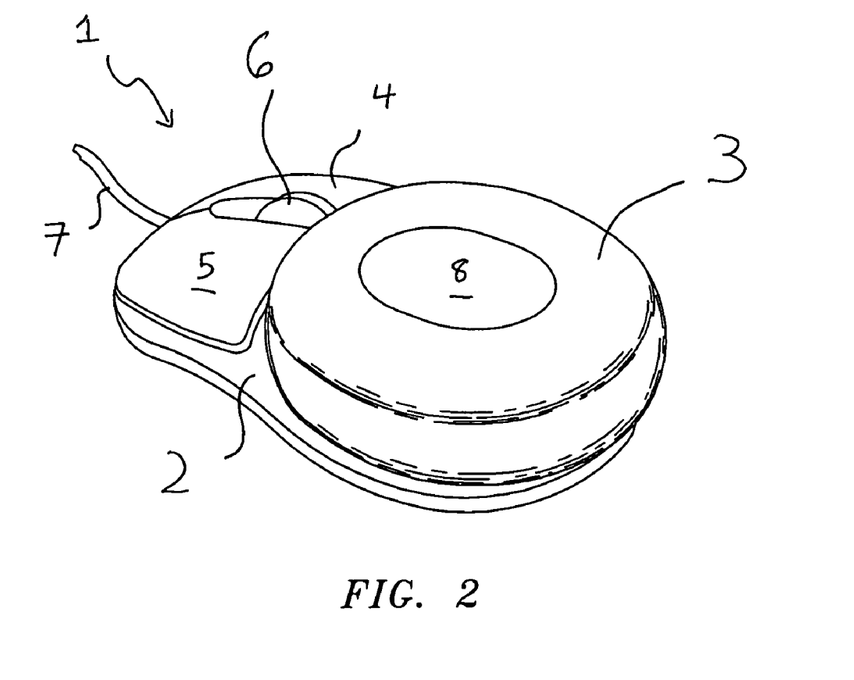
FIG. 2 illustrates a perspective view of the assembled mouse shown in FIG. 1.

Referring to the drawings in the present application, FIGS. 1 and 2 illustrate one embodiment of the computer mouse 1 in accordance with the present invention having a main body 2 with left 4 and right 5 click portions pivotally mounted upon an upper surface 2' of the main body, and a scrolling wheel 6 rotatably mounted upon the main body 2 between the left and right click portions 4,5. A ring or donut-shaped mounting cover 3 is formed of resilient or elastic material and provided with an inner hole 9 structured and arranged to complementary seat about a cylindrically-shaped projection 8 from the top surface 2' of the main body 2 spaced rearwardly from the left and right click portions 4,5 and scrolling wheel 6. Providing the mounting cover 3 to be resilient or elastic improves ease of gripping, moving and adjusting the computer mouse 1 while the computer is being used.

The mounting cover 3 is formed from elastic material and shaped to complementary seat about projection 8 from the surface 2' of main body 2 to be securely retained thereon, without need for further securing means. However, an adhesive layer can be conveniently applied to either the surface 2' and or mounting cover 3 to improve adherence of the mounting cover 3 thereon. However, the mounting cover 3 can always be easily detached from the main body 2 when necessary, either in the presence or absence of an additional adhesive layer. An example of an adhesive layer includes a hook and loop arrangement marketed under the name Velcro®. The elastic mounting cover 3 can be formed from any number of suitable resilient materials, e.g., rubber, silicone, plastic or gel products.

The inventive computer mouse 1 is illustrated as being electrically connected to a computer via a wire 7. However, electrical connection within the context of the present invention also includes connection in the absence of a physical interconnecting wire, i.e., through radio frequency signals. Furthermore, the mounting cover 3 and main body 2 can be easily coupled by being brought together in the direction of the dash-dot lines shown in FIG. 1.

Figure 3:
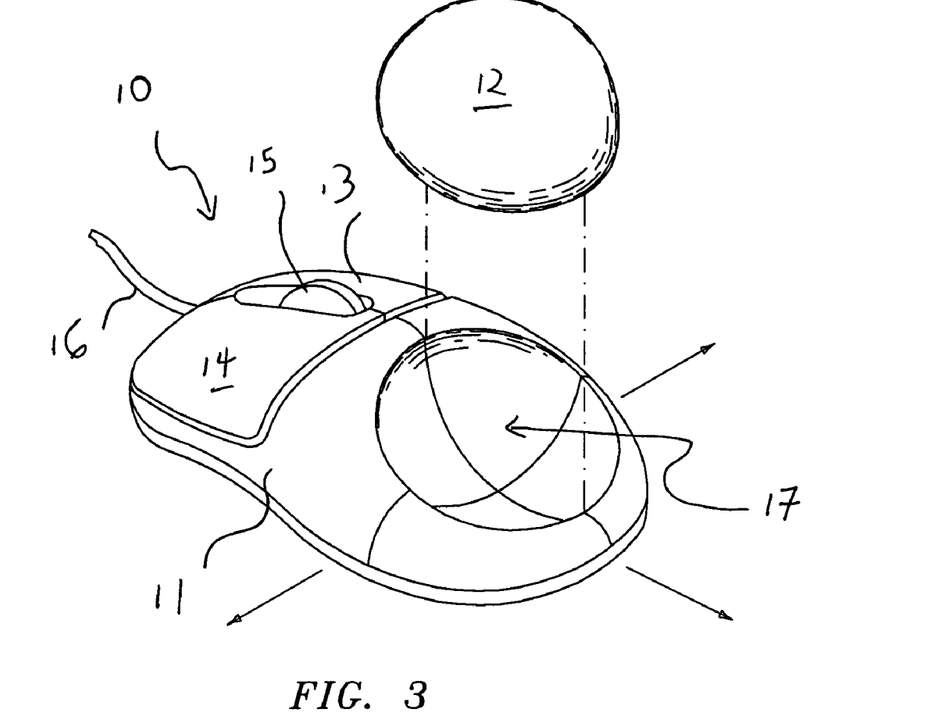
FIG. 3 illustrates an exploded perspective view of another embodiment of the computer mouse according to the present invention.
Figure 4:
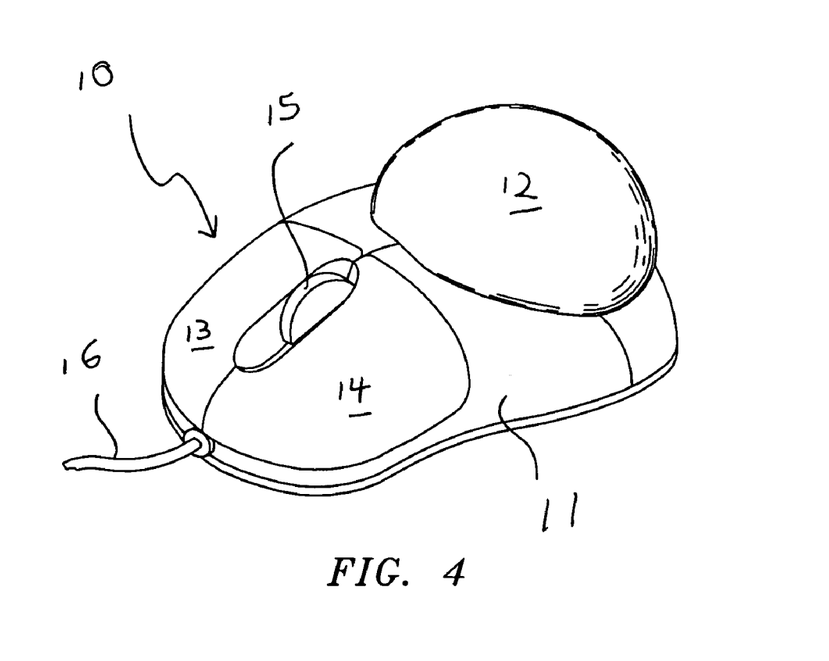
FIG. 4 illustrates a perspective view of the assembled mouse shown in FIG. 3.

FIGS. 3 and 4 illustrate an alternative embodiment of a computer mouse 10 in accordance with the present invention, in which a concavity 17 is provided in the top surface of the main body 11. The resiliently-formed mounting cover 12 is elliptical or egg-shaped and arranged to securely seat in the concavity in complementary fashion. An adhesive layer as described supra may also be provided, as needed. As can be seen in FIG. 4, the mounting cover 12 securely seated in the main body provides a protruding portion allowing easy gripping of the computer mouse 10 for movement and adjustment. Reference numerals 13 and 14 respectively denote left and right click portions, while reference numeral 15 denotes the scrolling wheel and reference numeral 16 the wire connection to a computer. The mounting cover 12 and main body 11 can also be brought together in the direction indicated by the dash-dot lines in FIG. 3.

Figure 5:
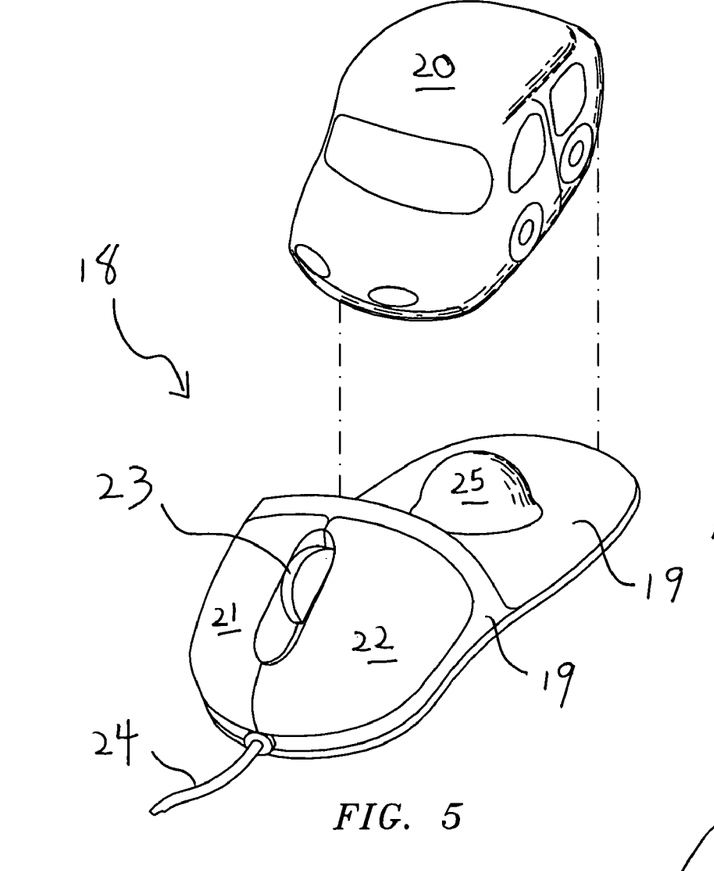
FIG. 5 illustrates an exploded perspective view of a further embodiment of the computer mouse according to the present invention.
Figure 6:
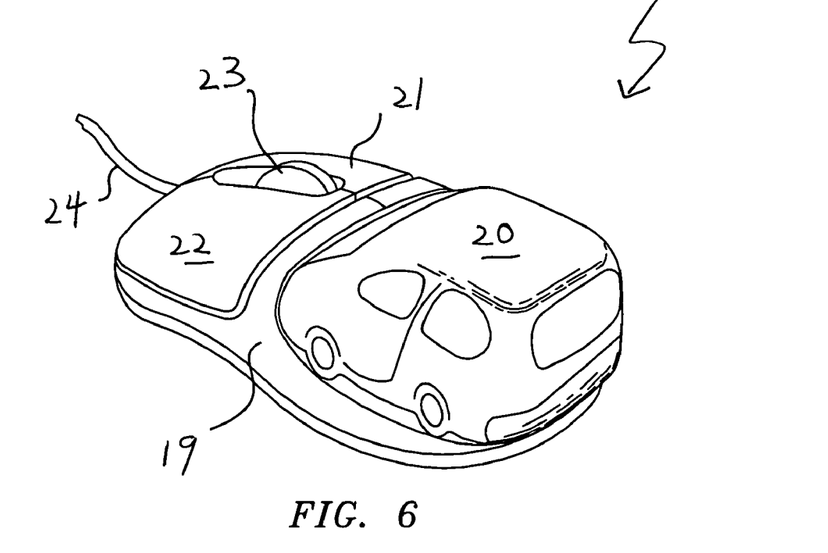
FIG. 6 illustrates a perspective view of the assembled mouse shown in FIG. 5.

FIGS. 5 and 6 illustrate an embodiment of the inventive computer mouse 18 in which the resiliently-formed mounting cover 20 has a distinct three-dimensional shape, i.e., the shape of a vehicle. Alternatively, the mounting cover may have any illustrative shape, e.g., a plant, animal, etc. to provide special attraction for a child, thus encouraging a child to easily grip the computer mouse 18 and learn how to use a computer. A projection 25 extending upwardly from the upper surface 19' of the main body 19 mates with a recess (not shown) on the lower surface of the mounting cover form 20. This mounting cover 20 can also be rotated about the projection 25, e.g., by a child to provide enjoyment and incentive to learn how to use a computer. Reference numerals 21 and 22 respectively denote left and right click portions with reference numeral 23 denoting the scrolling wheel and reference numeral 24 the connecting wire to the computer. The mounting cover 20 and main body 19 are also assembled in the direction of the dash-dot lines.

Figure 7:
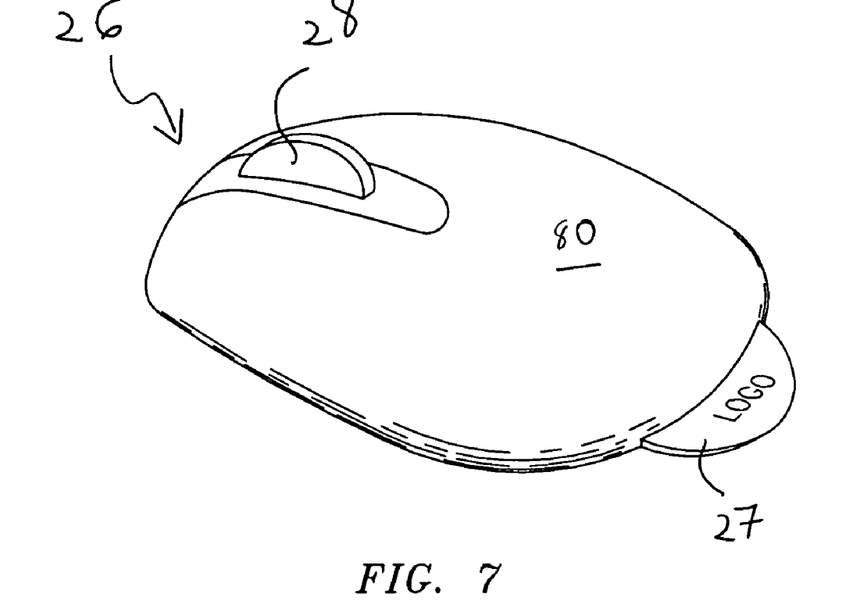
FIGS. 7-10 illustrate perspective views of alternative embodiments of the computer mouse in accordance with the present invention.
Figure 8:
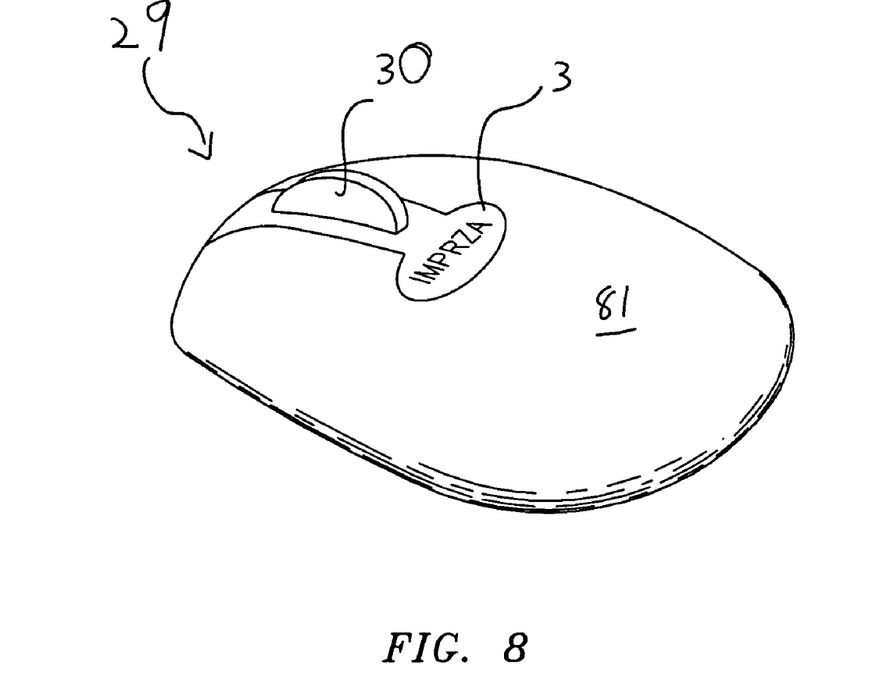

FIG. 7 illustrates an alternative embodiment of the computer mouse 26 in which the elastic cover 80 encompasses the entire upper surface of the main body except for the scrolling wheel 28. The left and right click portions can be activated by depressing the appropriate locations on top of the elastic cover 80. This embodiment helps shield the left and right click portions from damage. A display portion 27, e.g., in the shape of a tongue, protrudes from a rear end of the mounting body opposite the scrolling wheel 28 and left and right click portions. Information, e.g., operating information or advertising, can be imprinted or affixed on this display portion, also enhancing operation of the computer mouse 26. FIG. 8 illustrates an embodiment similar to FIG. 7 but where the elastic cover 81 encompasses the entire main body except for a portion 31 of an upper surface thereof adjacent the scrolling wheel 30. This portion 31 forms a display base for information analogous to tongue 27 shown in FIG. 7 supra. The embodiments shown in FIGS. 7 and 8 enhance ease of operating the left and right click portions because the elastic body of the mounting cover 80, 81, constructed of soft material such as rubber, silicone, etc., facilitates ease of depressing the click portions.

Figure 9:
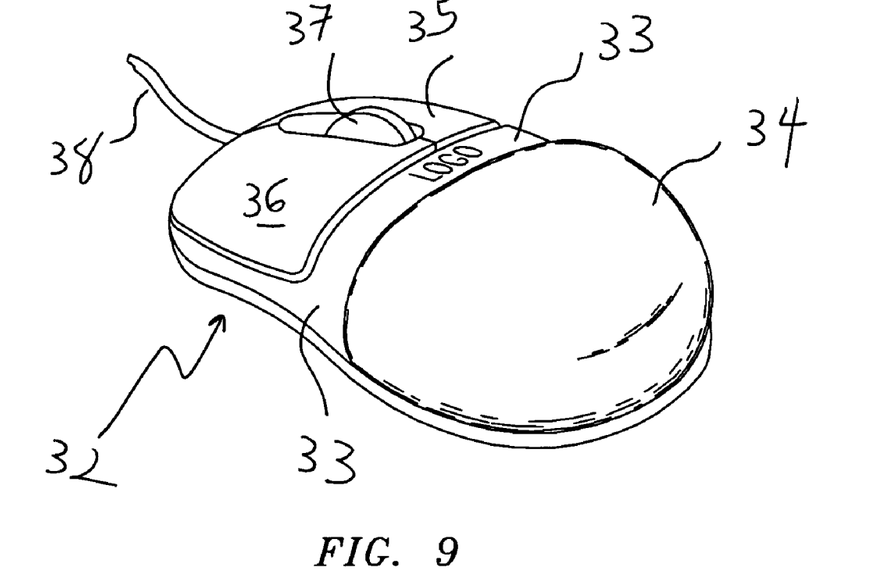
Figure 10:
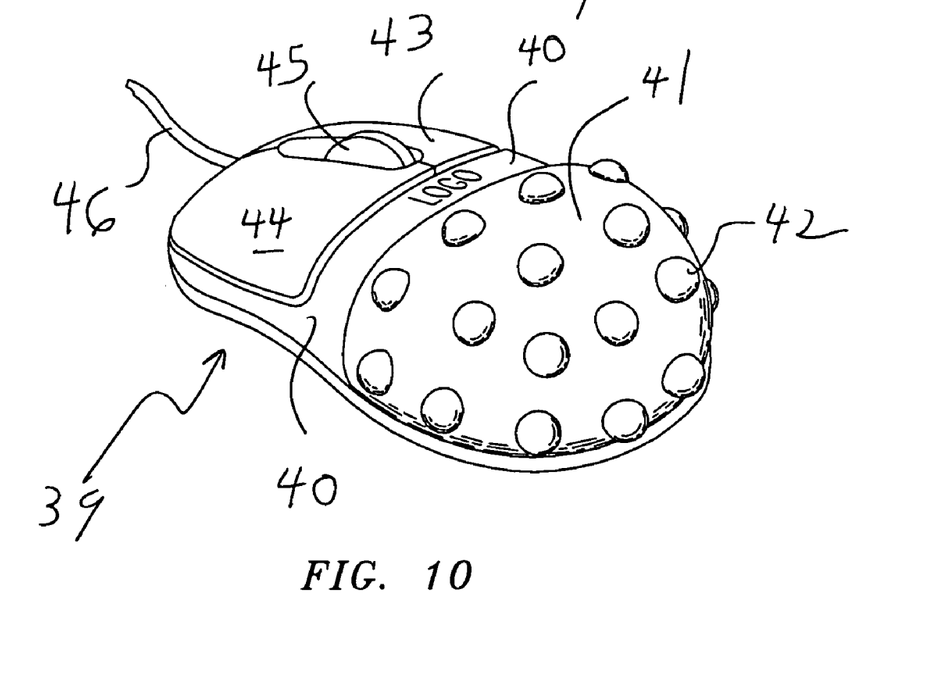

FIG. 9 illustrates an alternative embodiment of the inventive mouse 32 similar to FIGS. 3 and 4, but where the elastic mounting cover 34 is larger and encompasses more of the rear upper surface 33' of the main body 33 when coupled together. The main body 33 is shaped such that a portion of the upper surface 33' adjacent the left 35 and right 36 click portions (in addition to the scrolling wheel 37) is arranged to form a display surface, e.g., for a logo or the like. Reference numeral 38 denotes the connecting wire to a computer. The embodiment illustrated in FIG. 10 is similar to FIG. 9 except the elastic mounting cover 41 is provided with a series of elastic bumps 42 to enhance gripping of the computer mouse 39. The main body 40 is also provided with an upper surface 40' adjacent the left 43 and right 44 click portions and scrolling wheel 45 to function as a display surface (reference numeral 46 denotes the connecting wire to a computer). This particular embodiment enhances ease of operating the inventive computer mouse 39 because smaller area on the surface of the mounting cover 41 can be gripped by a hand to move, adjust and operate to mouse 39.

Figure 11:
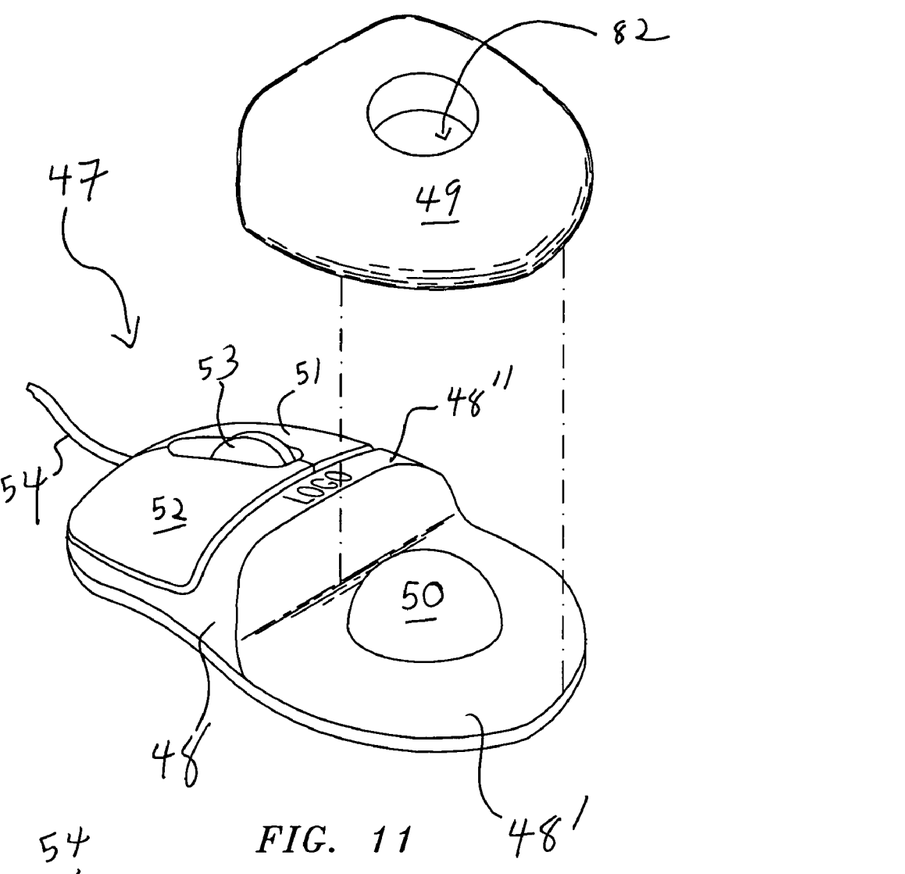
FIG. 11 illustrates an exploded view of an additional embodiment of the computer mouse according to the present invention.
Figure 12:
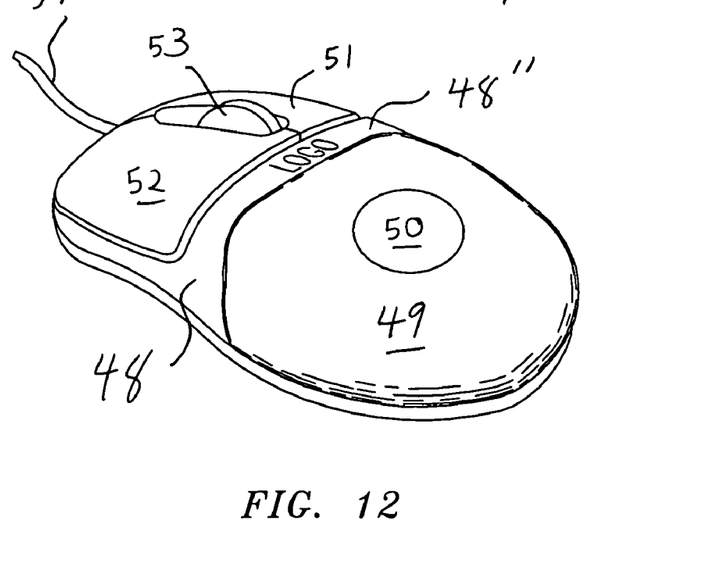
FIG. 12 illustrates a perspective view of the assembled mouse shown in FIG. 11.

The alternative embodiment illustrated in FIGS. 11 and 12 incorporates several of the features shown in the previously-discussed embodiments. More particularly, the inventive mouse 47 comprises a main body 48 having an upper surface 48' provided with a dome-shaped protrusion 50 structured and arranged to mate with a ring-shaped mounting cover 49 through an opening 82 provided therethrough. A portion 48'' of the upper surface 48' adjacent the left 51 and right 52 click members and scrolling wheel 53 is also arranged to display information, advertising, a logo, etc. The mounting cover 49 and main body 48 are also assembled in the direction of the dash-dot lines. Reference numeral 54 denotes the connecting wire to the computer.

Figure 13:
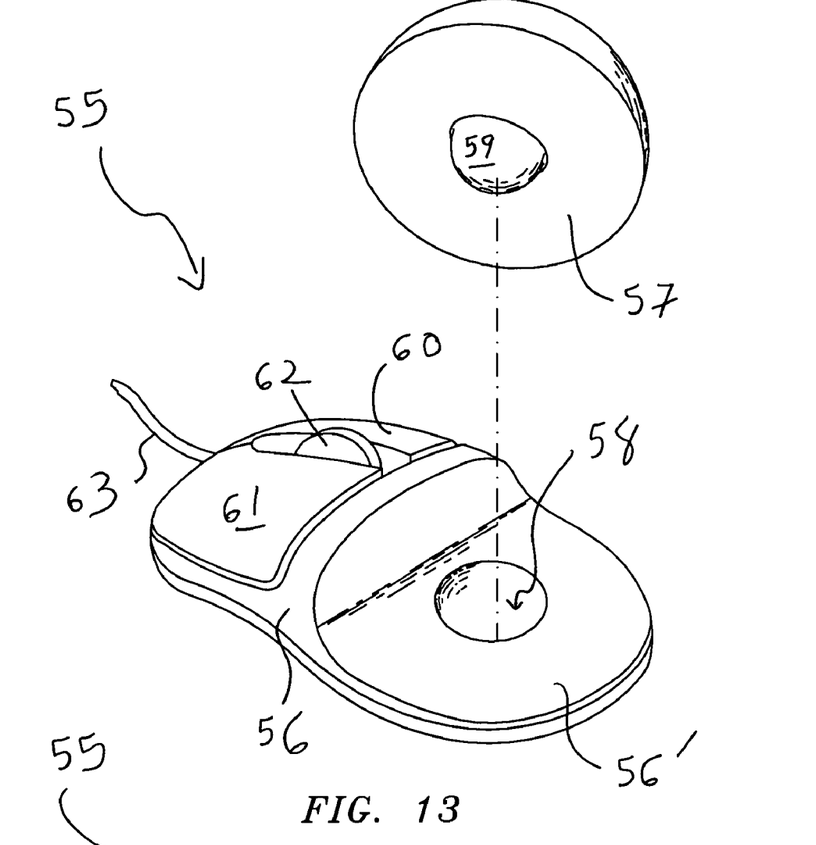
FIG. 13 illustrates an exploded view of yet another embodiment of the computer mouse according to the present invention.
Figure 14:
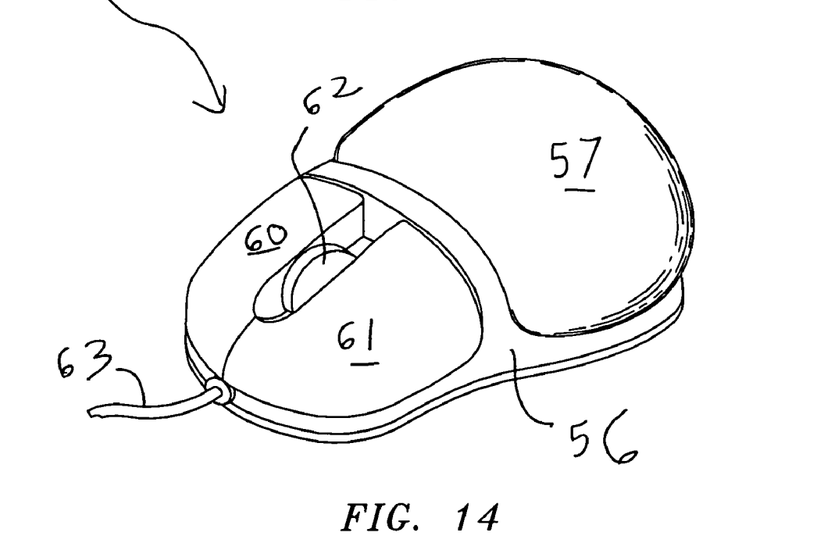
FIG. 14 illustrates a perspective view of the assembled mouse shown in FIG. 13.

FIGS. 13 and 14 illustrate an alternative embodiment of the inventive computer mouse 55 in which the elastic mounting cover 57 is provided with a dome-shaped protrusion 59 from a bottom surface thereof and arranged to seat in a concomitant recess 58 provided in the upper surface 56' of the main body 56 in the direction of the dash-dot line. Reference numerals 60 and 61 respectively denote left and right click portions, with reference numeral 62 denoting the scrolling wheel and reference numeral 63 the connecting wire to the computer.

Figure 15:
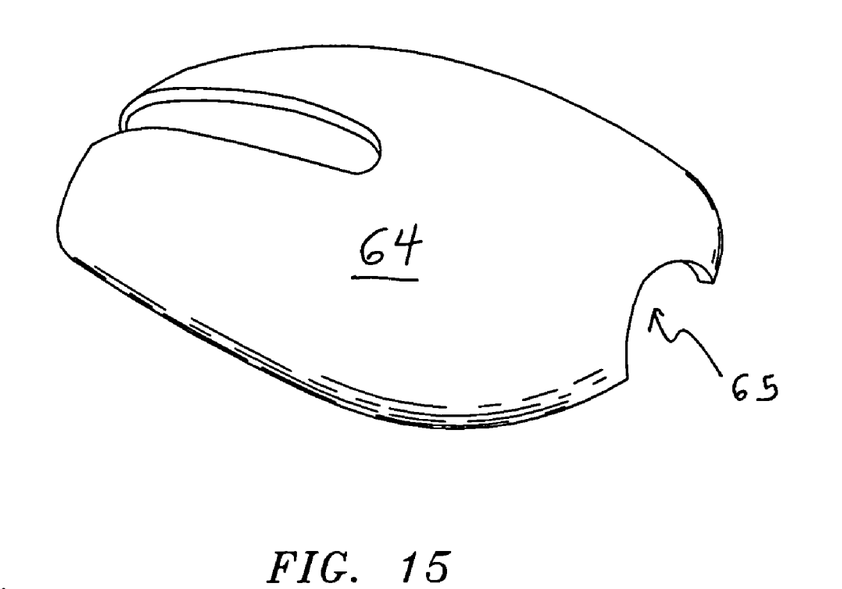
FIG. 15 illustrates a perspective view of one embodiment of a cover arranged to seat upon a computer mouse according to the present invention.
Figure 16:
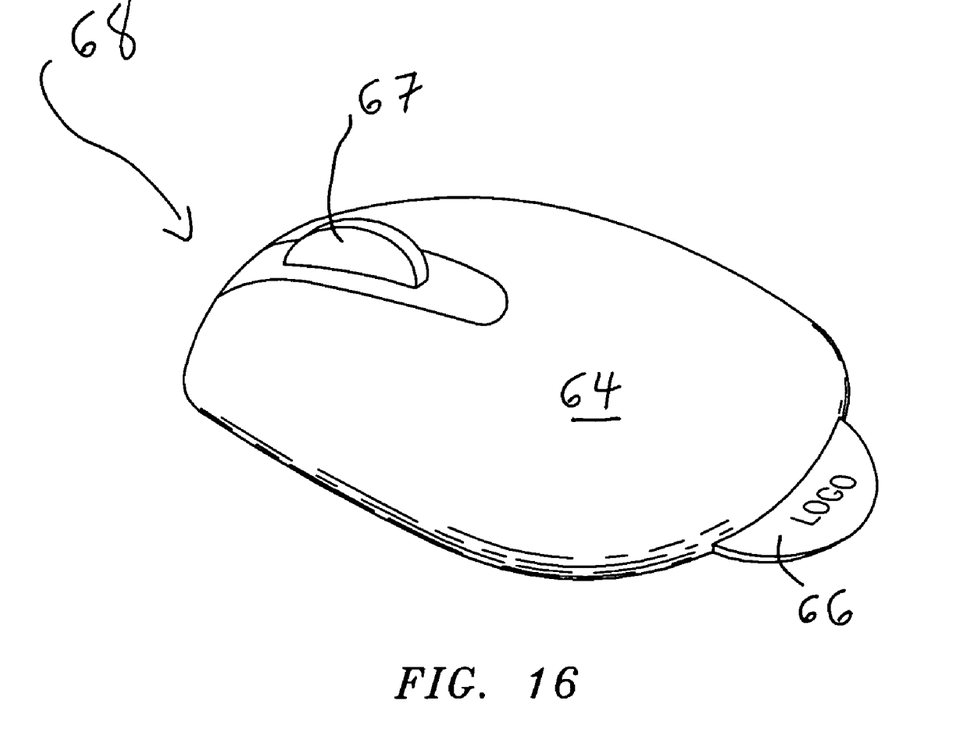
FIG. 16 illustrates a perspective view of an assembled computer mouse with the cover illustrated in FIG. 15 and which is similar to the embodiment illustrated in FIG. 7 supra.

In the embodiment illustrated in FIGS. 15 and 16, the elastic mounting cover is provided with a cutout 65 at a rear end thereof which is structured to allow display tongue 66 protruding from the main body to extend outwardly and be exposed when the cover 64 is assembled onto the main body and essentially covers the entire main body of the computer mouse 68 except for the scrolling wheel 67. This embodiment is essentially identical to the embodiment illustrated in FIG. 7 supra.

Figure 17:
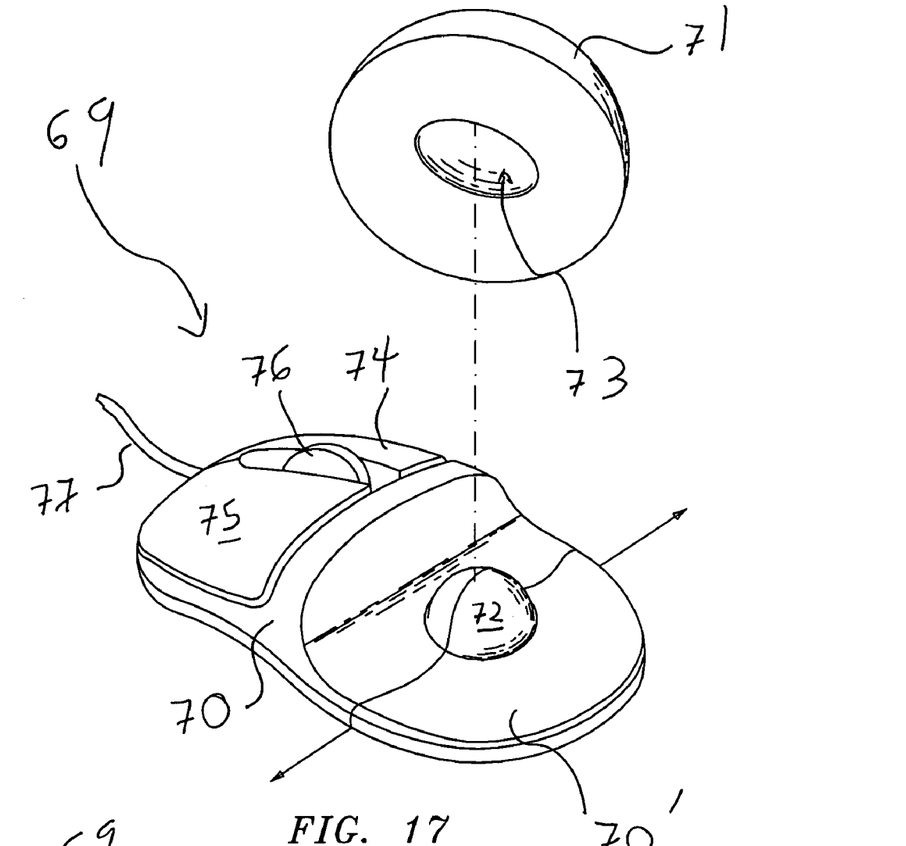
FIG. 17 illustrates an exploded view of still another embodiment of the computer mouse according to the present invention.
Figure 18:
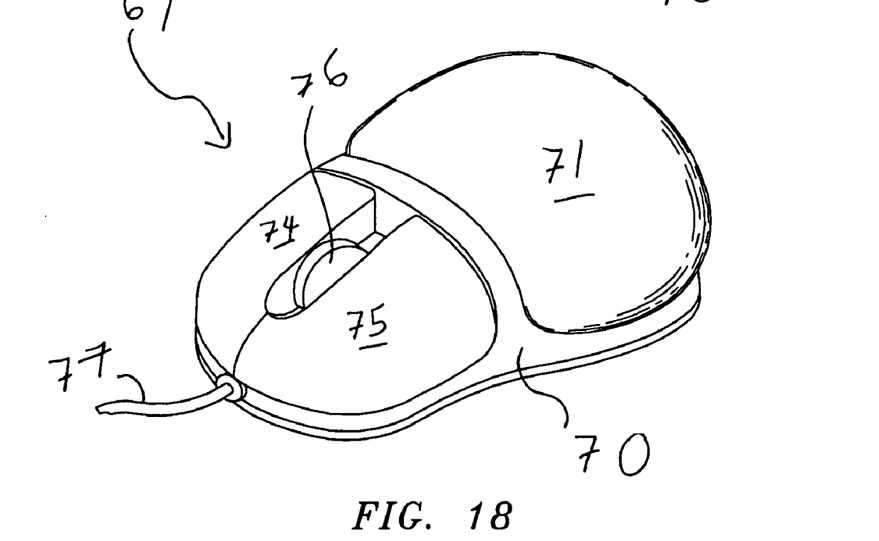
FIG. 18 is a perspective view of the assembled mouse illustrated in FIG. 17.

In the embodiment illustrate in FIGS. 17 and 18, the dome-shaped elastic mounting cover 71 is provided with a cavity 73 on an underside thereof and which is designed to seat over dome shaped projection 72 on the upper surface 70' of the main body 70. This embodiment is similar to the embodiment illustrated in FIGS. 13 and 14 supra, except the projection 72 is provided on the surface 70' of the main body 70 and the concavity 73 on the lower surface of the mounting cover 71. Reference numerals 74 and 75 denote left and right click portions with reference numeral 76 denoting the scrolling wheel and reference numeral 77 the connecting wire of the computer mouse 69 to a computer. The dash-dot line indicates the direction of coupling the main body 70 and cover 71.

The main body of the inventive computer mouse can be formed from any suitable material, e.g., hard plastic, with the projections 8, 25, 50, 72 also being formed from the same hard plastic upon molding, or alternatively separately formed from elastic, rubbery material secured to the main body, e.g., by glueing. Any type of design, e.g., letters, patterns, logos, marks, characters, etc. can also be presented on the surface of the mounting cover which can take any accepted three-dimensional shape, e.g., a square, ring, ellipse or the shape of a known object. By the same, token, the concavity and mating protrusion may take any acceptable three-dimensional shape such as a cube, mound, oval, triangle, etc. Advertising information and/or labeling can be affixed to the requisite surfaces, e.g., by decals. The elastically-formed mounting cover helps reduce muscle soreness in the hand caused by repeated gripping of the computer mouse.

The preceding description of the present invention is merely exemplary and not intended to limit the scope thereof in any way.

What is claimed is:

1. A mouse structured and arranged as an input device for a computer, comprising:
   a main body structured and arranged to be electrically coupled to the computer;
   left and right click portions located on an upper surface of said main body; and
   a mounting cover formed of resilient or elastic material; wherein
   said mounting cover is structured and arranged to be detachably mounted upon said main body, and
   said main body comprises a convex protrusion extending above the upper surface thereof at a location spaced away from said right and left click portions and upon which said mounting cover, in turn comprising a concave indentation, is structured and arranged to seat in complementary fashion, with said protrusion and indentation mating with one another.

2. The mouse of claim 1, wherein said mounting cover is structured and arranged to detachably seat upon said main body such that said left and right click portions can be activated by pressing said mounting cover.

3. The mouse of claim 1, additionally comprising an adhesive layer freely removably applied upon the upper surface of said main body at a location spaced away from said right and left click portions and structured and arranged to removably adhere said mounting cover to said main body when said mounting cover is brought into engagement with said adhesive surface.

4. The mouse of claim 1, wherein said mounting cover comprises an upper surface substantially round or circular in shape when removably mounted upon said main body.

5. The mouse of claim 1, wherein said mounting cover comprises an upper surface in a three-dimensional shape of a plant, animal or vehicle when removably mounted upon said main body.

6. The mouse of claim 1, wherein said resilient or elastic material is form from rubber, plastic or gel products.

7. The mouse of claim 1, wherein an upper surface of said mounting cover is structured and arranged to have images such as letters and/or patterns displayed thereon.

8. The mouse of claim 1, wherein said mounting cover is in a three-dimensional shape selected from the group consisting of logos, marks and characters.

9. The mouse according to claim 1, additionally comprising
   a scrolling portion rotatably mounted upon said main body;
   the upper surface of said main body comprising a portion structured and arranged to display letters and/or patterns such as an advertisement;
   said display portion is structured and arranged upon either a circumference of said rotating portion for scrolling or a tongue shaped extension projecting from a rear end of said main body located away from said left and right click portions,
   said mounting cover is structured and arranged to be detachably mounted upon said main body to cover both said right and left click portions, and said mounting cover also comprising an upper surface structured and arranged to display images such as letters and/or patterns.

10. A mouse structured and arranged as an input device for a computer, comprising:
   a main body structured and arranged to be electrically coupled to the computer;
   left and right click portions located on an upper surface of said main body; and
   a mounting cover formed of resilient or elastic material, wherein
   said mounting cover is structured and arranged to be detachably mounted upon said main body,
   said main body comprise a convex portion on the upper surface thereof at a location spaced away from said right and left click portions and upon which said mounting cover is structured and arranged to seat in complementary fashion, and
   said convex portion is in a three-dimensional angled or cylindrical shape.

11. A mouse structured and arranged as an input device for a computer, comprising
   a main body structured and arranged to be electrically coupled to a computer,
   left and right click portions located on an upper surface of said main body,
   a scrolling portion rotatably mounted upon said main body;
   an upper surface of said main body comprising a portion structured and arranged to display images such as letters and/or patterns such as an advertisement, and
   a mounting cover formed of resilient or elastic material, wherein
   said mounting portion is structured and arranged to be detachably mounted upon said main body,
   said display portion of said main body comprises a portion at least partially projecting from said main body such that said display portion is positioned between said left and right click portions,
   said mounting cover also comprise an upper surface structured and arranged to display images such as letters and/or patterns when detachably mounted upon said main body, and
   said main body comprises a convex portion positioned upon the upper surface thereof at a location spaced away from said right and left click portions and upon which said mounting cover is structured and arranged to seat in complementary fashion.

12. The mouse of claim 11, wherein said main body comprises a concave portion positioned upon the upper surface thereof at a location spaced away from said right and left click portions and upon which said mounting cover is structured and arranged to seat in complementary fashion.

* * * * *